US009785432B1

United States Patent
Wright (10) Patent No.: US 9,785,432 B1
(45) Date of Patent: *Oct. 10, 2017

(54) AUTOMATIC DEVELOPER BEHAVIOR CLASSIFICATION

(71) Applicant: SEMMLE LIMITED, Oxford (GB)

(72) Inventor: Ian Paul Wright, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/290,558

(22) Filed: Oct. 11, 2016

(51) Int. Cl.
G06F 9/45 (2006.01)
G06F 9/44 (2006.01)
G06F 17/30 (2006.01)

(52) U.S. Cl.
CPC .......... G06F 8/77 (2013.01); G06F 17/30598 (2013.01)

(58) Field of Classification Search
CPC ........... G06F 8/20; G06Q 10/06; G06Q 10/10
USPC ......................................................... 717/102
See application file for complete search history.

(56) References Cited

U.S. PATENT DOCUMENTS

| 6,381,735 B1 | 4/2002 | Hunt |
| 6,557,011 B1 | 4/2003 | Sevitsky et al. |
| 8,365,286 B2 | 1/2013 | Poston |
| 9,305,279 B1* | 4/2016 | Menzel ............ G06Q 10/06398 |
| 2006/0168565 A1 | 7/2006 | Gamma et al. |
| 2007/0124202 A1 | 5/2007 | Simons |
| 2008/0208654 A1* | 8/2008 | Nahikian ............... G06Q 10/06 705/7.22 |
| 2016/0132326 A1* | 5/2016 | Henriksen ......... G06F 17/30106 717/122 |
| 2016/0162289 A1* | 6/2016 | Henriksen ........... G06F 11/3604 717/123 |

* cited by examiner

*Primary Examiner* — John Chavis
(74) *Attorney, Agent, or Firm* — Fish & Richardson P.C.

(57) ABSTRACT

Methods, systems, and apparatus, including computer programs encoded on computer storage media, for designating developers as having a particular skill. One of the methods includes obtaining a reference collection of snapshots for a code base, wherein each snapshot comprises a representation of source code of the code base at a particular time, each snapshot being associated with a particular developer of a plurality of developers of the code base. A plurality of metrics for each developer that committed at least one snapshot to the reference collection of snapshots is computed. Respective values of the plurality of metrics are partitioned into a plurality of respective partitions, and each of the plurality of developers are assigned to one of the plurality of partitions for each of the plurality of metrics. Developers in one or more top-ranked partitions are designated as developers having a particular skill.

22 Claims, 4 Drawing Sheets

AUTOMATIC DEVELOPER BEHAVIOR CLASSIFICATION

BACKGROUND

This specification relates to static analysis of software source code.

Static analysis refers to techniques for analyzing computer software source code without executing the source code as a computer software program. Static analysis systems analyze source code to determine various properties about source code in a code base and properties of developers who commit code to the code base.

Source code is typically maintained by developers in a code base of source code using a version control system. Version control systems generally maintain multiple revisions of the source code in the code base, each revision being referred to as a commit or a snapshot. Each snapshot includes the source code of files of the code base as the files existed at a particular point in time.

Relationships among snapshots stored in a version control system can be represented as a directed, acyclic revision graph. Each node in the revision graph represents a commit of some portion of the source code of the code base. Each commit identifies source code of a particular snapshot as well as other pertinent information about the snapshot, such as the author of the snapshot and data about ancestors of the commit in the revision graph. A directed edge from a first node to a second node in the revision graph indicates that a commit represented by the first node occurred before a commit represented by the second node, and that no intervening commits exist in the version control system.

A static analysis system can analyze source code of a particular snapshot of the code base to identify characteristic segments of source code in the snapshot. For example, a static analysis system can identify violations in the source code of a particular set of coding standards. A static analysis system can also identify a responsible contributor for each characteristic segment of source code and attribute the characteristic segment to the responsible contributor, e.g., to a particular developer or group of developers.

SUMMARY

This specification describes how a static analysis system can designate developers of a code base as having particular skills or conforming to certain predetermined types of developer behavior. The static analysis system analyzes a developer's history and computes values of one or more metrics. The values of the one or more metrics indicate the developer's strengths and weaknesses with respect to the one or more metrics and relative to a reference population of other developers.

In general, one innovative aspect of the subject matter described in this specification can be embodied in methods that include the actions of obtaining a reference collection of snapshots for a code base, wherein each snapshot comprises a representation of source code of the code base at a particular time, each snapshot being associated with a particular developer of a plurality of developers of the code base; computing a plurality of metrics for each developer that committed at least one snapshot to the reference collection of snapshots, including: computing for each developer a respective measure of churn, wherein a unit of churn indicates a line of code added, changed, or deleted by the developer in the reference collection of snapshots; computing for each developer a respective first measure of net new violations for a first category of violation types, including comparing (i) a first measure of violations introduced by the developer that have a violation type in the first category of violation types to (ii) a second measure of violations removed by the developer that have a violation type in the first category of violation types; computing for each developer a respective second measure of net new violations for a second category of violation types, including comparing (i) a first measure of violations introduced by the developer that have a violation type in the second category of violation types to (ii) a second measure of violations removed by the developer that have a violation type in the second category of violation types; partitioning respective values of the plurality of metrics into a plurality of respective partitions; assigning each of the plurality of developers to one of the plurality of partitions for each of the plurality of metrics; designating developers in one or more top-ranked partitions as developers having a particular skill.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Computing a plurality of metrics for each developer that committed at least one snapshot to the reference collection of snapshots further includes computing for each developer a respective measure of recency, wherein a unit of recency indicates the commitment of a revised snapshot to the reference collection of snapshots by the developer in the reference collection of snapshots. The first category of violation types comprises bug-type violations. The second category of violation types comprises maintenance-type violations. The reference collection of snapshots for the code base comprises snapshots of a reference collection of snapshots spanning an entire project history. The reference collection of snapshots for the code base comprises snapshots from a preselected period of time. Partitioning respective values of the plurality of metrics into a plurality of respective partitions comprises, for each metric in the plurality of metrics: determining a global maximum and minimum value of the metric over all developers that committed at least one snapshot to the reference collection of snapshots; partitioning the range of values between the determined global maximum and global minimum into a plurality of partitions. The determined global maximum value of the net new violations metric is equal to zero. Partitioning the range of values between the determined global maximum and global minimum into a plurality of partitions comprises applying non-linear bucket division techniques. Partitioning the range of values between the determined global maximum and global minimum into a plurality of partitions comprises applying a clustering algorithm. Applying a clustering algorithm comprises applying one or more constraints on a number of clusters generated by the clustering algorithm. The actions include computing a composite metric for each developer based on the computed plurality of metrics; partitioning respective values of the composite metric into a plurality of respective partitions; assigning each of the plurality of developers to one of the plurality of partitions for the composite metric; and designating developers in one or more top-ranked partitions as developers having all-round skill. Computing a plurality of metrics for each developer that committed at least one snapshot to the reference collection of snapshots is performed in parallel for all snapshots.

Particular embodiments of the subject matter described in this specification can be implemented so as to realize one or more of the following advantages. A static analysis system implementing automatic developer behavior classification, as described in this specification, provides an easy-to-understand and motivating summary of the strengths and weaknesses of each of multiple developers of a code base. The strengths and weaknesses of each individual developer may be generated independently and relative to a reference population of other developers, thus providing a good distribution over independent developer qualities, ensuring a lack of bias when evaluating individual developers, and enabling evaluation of individual developers to be performed quickly and efficiently.

In addition, a summary of developers' strengths and weaknesses may be used by managers or team leaders to make intelligent choices for further development of the code base, e.g., choices relating to team composition or pair programming, which may improve code quality. For example, if a new feature needs to be added to a code base managers or team leaders may use the system to identify one or more "trail blazers" who have relatively high churn metrics. As another example, if a new release is approaching managers or team leaders may use the system to identify one or more "bug squashers" to reduce the number of bugs in the new release. As another example, a company with multiple projects can compose teams that assign high-performing developers to important projects, or alternatively assign developers to projects to ensure a more uniform distribution of strengths and weaknesses across teams.

Furthermore, the summary may be used by developers themselves for individual self-evaluation, which in turn may lead to an improvement in future code quality. For example, individual developers may use the summary to track their own progress and determine areas in which they can improve on. Individual developers may also compare themselves to other developers, e.g., other developers in their team or developers with similar experience or backgrounds. Individual developers may also use the summary to become more aware of best-practice qualities, e.g., as captured by the developer classifications in the summary, that they lack and wish to gain.

A static analysis system implementing automatic developer behavior classification, as described in this specification, may be used to generate optimal training programs that correct developer deficiencies and improve code quality. For example, the system may determine strengths and weaknesses of multiple developers of a code base, or may determine the rate of change of developer qualities over time which may be used to indicate when an individual developer's rate of improvement is less than that of their peers. Based on the determined weaknesses, managers or team leaders may generate training programs that target current deficiencies in developer skills.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A static analysis system can designate developers as developers having particular skills based on computing multiple metrics for each developer of a code base. In this specification, where reference is made to computing a measure of a metric for a developer, the same techniques can also be applied to any appropriate contributor of source code in the code base, e.g., a team of developers in an organization or a selected group of developers.

The metrics computed by the systems described below represent developer characteristics associated with particular developer skills. The metrics are easy to understand, motivating, and tend to provide a good distribution over independent developer qualities. For example, the computed metrics may include a measure of churn, where a unit of churn indicates a line of code added, changed, or deleted by the developer in the reference collection of snapshots. A unit of churn may also represent a number of files modified, commits, or any combination of these. Developers with high measures of churn may be described as exhibiting "trail blazing" developer skills and referred to as "trail blazers."

As another example, the computed metrics may include measures of net new source code violations. In general, a source code violation is a segment of source code that includes a violation of a particular coding standard. The computed metrics may include measures of net new source code violations of different violation types. For example, developers with low net new violations of a bug-fixing violation type may be described as exhibiting "bug squashing" developer skills and may be referred to as "bug squashers." Similarly, developers with low net new violations of a refactoring violation type may be described as exhibiting "refactoring" developer skills and may be referred to as "refactorers."

As another example, the computed metrics may include measures of recency, e.g., measures of weighted numbers of commits to a revision control system. Developers with high numbers of revision commits may be described as exhibiting "busy beaver" developer skills and may be referred to as "busy beavers".

Further examples of computed metrics may include measures of proportions of a project's codebase. Developers who are responsible for a high proportion of a project's codebase may be described as exhibiting "builder" developer skills and may be referred to as "builders." In addition, the computed metrics may include measures of rate-of-change of other metrics. Developers with a positive rate-of-change of other metrics may be described as exhibiting "self-improver" behavior and may be referred to as "self-improvers." In addition, the computed metrics may include measures of an amount of written test code. Developers who write a lot of test code may be described as exhibiting "tester" behavior and may be referred to as "testers."

In addition, the computed metrics may include measures of an amount of written long-term, stable code that is used by many subsystems. Developers that write long-term, stable code that is used by many subsystems may be described as exhibiting "key contributions" and may be referred to as "key contributors." In addition, the computed metrics may include measures of contributions of code written in different languages. Developers that contribute code written in many different languages may be described as exhibiting "polyglot" behavior and may be referred to as "polyglots."

In some cases a computed metric may include aggregations of computed metrics, e.g., aggregations of the computed metrics described above. For example, developers that exhibit multiple developer skills may be described as exhibiting "hero" behavior and may be referred to as "heroes."

Figure 1:
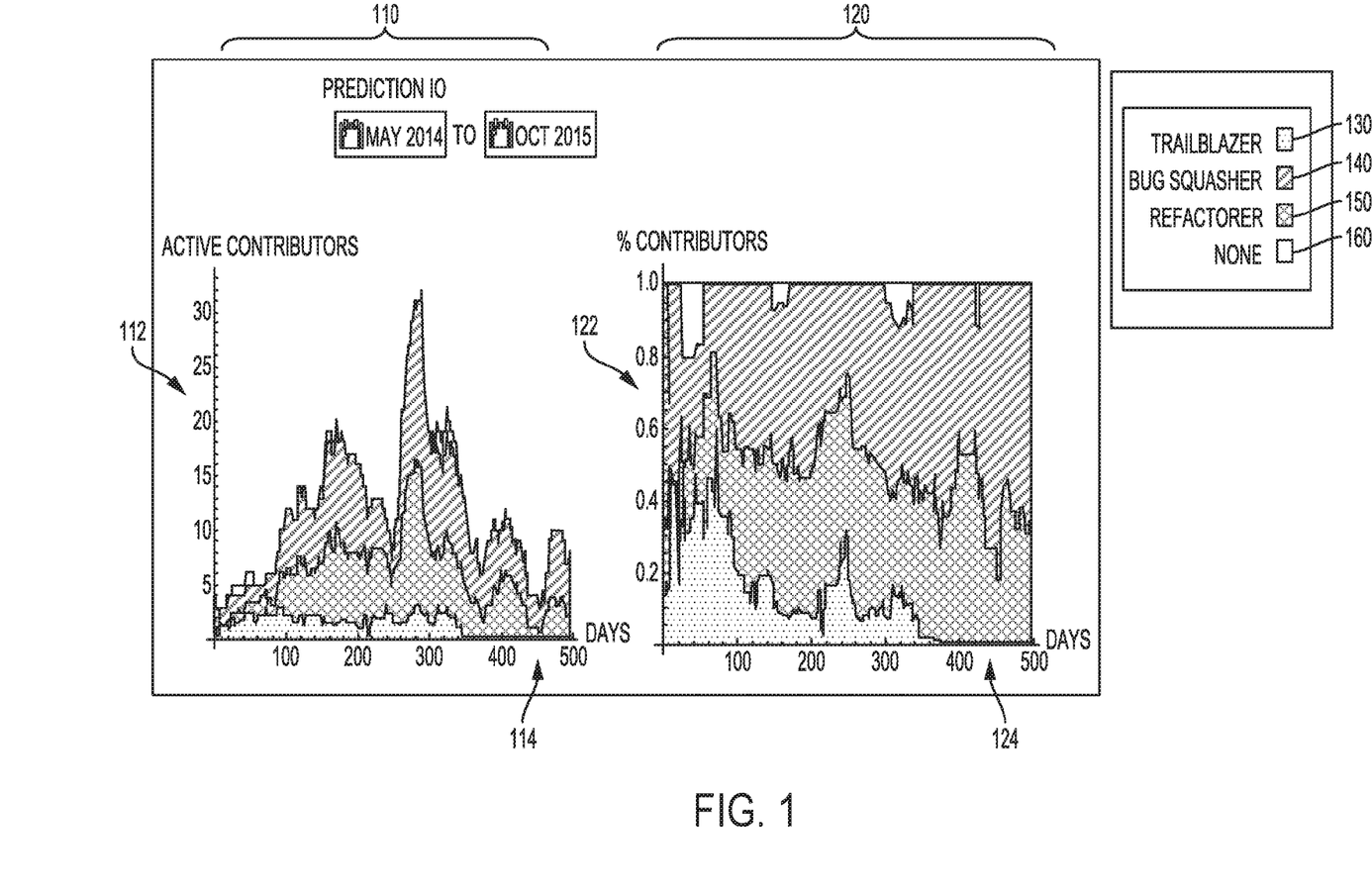
FIG. 1 illustrates an example graphical representation of developer skills for a code base over an example fixed time period.

FIG. 1 illustrates an example graphical presentation of developer skills for a code base over an example fixed time period. As shown in FIG. 1, the example developer skills for the code base are shown over a fixed time period including 17 months from May 2014 to October 2015, e.g., a time period representing an entire project history. FIG. 1 includes two plots 110 and 120 that illustrate example developer skills for the code base over the example fixed time period. For illustrative purposes, the developer skills illustrated in plots 110 and 120 include "trail blazing" skills 130, "bug squashing" skills 140, "refactoring" skills 150 and other skills 160.

Plot 110 includes an x-axis 114 representing time, measured in days, and a y-axis 112 representing a number of active contributors or developers to the code base. Plot 110 illustrates that at any given time during the fixed time period the developers in the team overall exhibited less 'trail blazing' skills compared to 'bug squashing' skills. In addition, plot 110 illustrates spikes in the number of active developers, e.g., between the 150 day and 200 day marks and between the 250 and 300 day marks. In particular, during these periods of time the developers in the team overall exhibited increased "bug squashing" and "refactoring" skills. These periods of increased "bug squashing" and "refactoring" skills may be due to a schedule associated with the code base. For example, during these time periods one or more new releases may have been approaching, and developers cleaned the source code before its release. Following the spikes, the developers in the team exhibited less "trail blazing" skills.

Plot 120 includes an x-axis 124 representing time, measured in days, and a y-axis 122 representing a percentage of contributors or developers to the code base. Plot 120 clearly shows the decrease in the percentage of developers exhibiting "trail blazing" behavior after the second spike between the 250 and 300 day marks. Plot 120 shows that there were often occasions where the team focused more on 'bug squashing' behaviors than 'refactoring' behaviors, e.g., between the 100 and 200 day marks and after the 250 day mark.

Plots 110 and 120 may be used by management or team leaders associated with the code base to correlate developer behavior with the source code schedule. For example, management may have determined that prior to or during a new release of the source code, the number of developers with high "bug squashing" skills should significantly increase. The system can then identify one or more developers as having high "bug squashing" developer skills, e.g., using the techniques described below with reference to FIGS. 2-4. Using the developers identified as "bug squashers," rather than arbitrarily chosen developers, can significantly decrease the number of bugs in the new release.

As another example, the plots 110 and 120 can be used to determine deficiencies in the number of developers with particular skills contributing to the source code at any given time. For example, the plots 110 and 120 can indicate that after the 400-day mark new features were added to the source code and that the progress at which the new features were added was unacceptably slow. For the next new feature, the system can identify one or more developers with high "trail blazing" developer skills, who should be assigned to work on the source code Designating developers as having particular skills is described below with reference to FIGS. 2-4.

Figure 2:
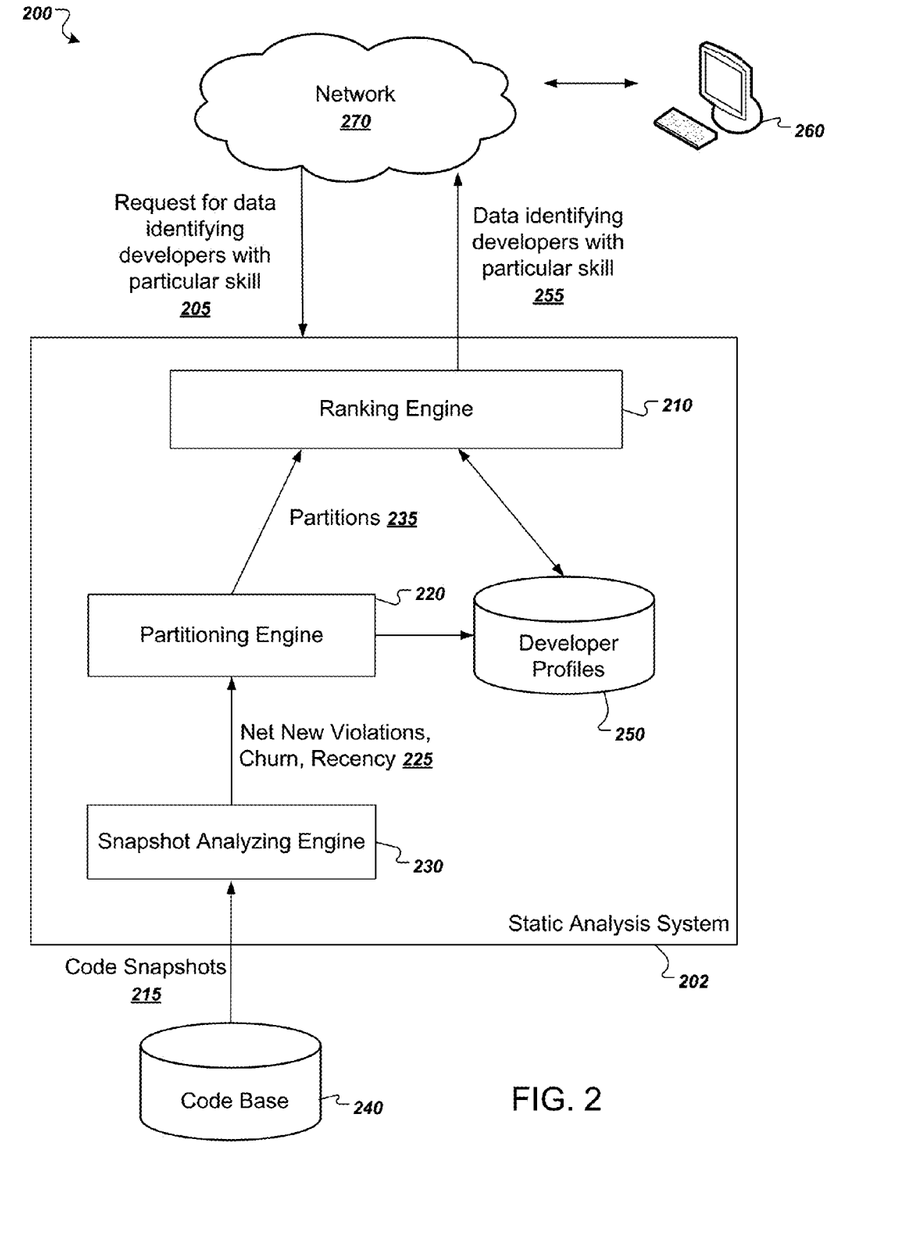
FIG. 2 is a diagram of an example system.

FIG. 2 is a diagram of an example system 200. The system 200 includes a user device 260 in communication with a static analysis system 202 over a network 270. The static analysis system 202 includes several components, including a ranking engine 210, a partitioning engine 220, and a snapshot analyzing engine 230. The components of the static analysis system 202 can be implemented as computer programs installed on one or more computers in one or more locations that are coupled to each other through a network.

A user of user device 260 can use the static analysis system 202 to obtain data identifying developers of a code base 240 with a particular skill 255. For example, a user may wish to identify developers that conform to certain predetermined types of developer behavior, e.g., "trail blazers," "bug squashers," "refactors," or "busy beavers." In some implementations a user of the user device 260 may wish to identify developers that conform to multiple predetermined types of developer behavior, e.g., both "bug squashers" and "trail blazers." A user can submit a request for data identifying developers of a code base with a particular skill 205 to the static analysis system 202 over the network 270, which can be any appropriate data communications network, e.g., one that includes an intranet or the Internet.

The code base 240 includes a reference collection of code snapshots, where each code snapshot includes a representation of source code at a particular time and is associated with a particular developer of the code base 240. The request for data identifying developers of a code base with a particular skill can include an identifier of the code base 240 for analysis and one or more requested parameters. For example, the request can specify a particular time period over which to identify developers, e.g., an entire project history or a past year or quarter, can specify identifiers of a subset of developers, e.g., a particular group or team of developers, or can specify a particular language of projects included in the code base 240.

Before or after the request for data identifying developers of a code base with a particular skill 205 is received, the static analysis system 202 can use a snapshot analyzing engine 230 to analyze code snapshots 215 in the code base 240 and compute multiple values of metrics for each developer that committed one or more code snapshots to the code base 240. For example, the snapshot analyzing engine 230 may compute a respective measure of churn for each developer, where a unit of churn indicates a line of code added, changed, or deleted by the developer in the code base 240. As another example, the snapshot analyzing engine 230 may compute a respective measure of recency for each developer, where a unit of recency indicates the commitment of a revised code snapshot to the code base 240 by the developer.

The snapshot analyzing engine 230 may further identify source code violations that occur in a code snapshot 215 of the code base 240. For example, the snapshot analyzing engine 230 may compute respective measures of net new violations for different violation types, e.g., bug-type violations or maintenance type violations, for each developer by comparing a measure of violations introduced by the developer that have a particular violation type to a second measure of violations removed by the developer that have the same violation type. Example processes for computing net new violations are described in commonly owned U.S. Patent Application No. 61/983,932, for "Source Code Violation Matching and Attribution," to Henriksen et al., which is incorporated here by reference. Alternatively, the net new violations 225 can be obtained from other sources rather than being computed by the static analysis system 202.

The snapshot engine 230 may analyze code snapshots 215 in the code base 240 and compute multiple values of metrics for each developer that committed one or more code snapshots to the code base 240 in parallel for all snapshots 210 in the code base 240, e.g., using a map-reduce framework.

The partitioning engine 220 receives the computed metrics, e.g., computed measures of net new violations, churn or recency 225, from the snapshot analyzing engine 230. The partitioning engine 220 then partitions the values of the computed metrics into multiple respective partitions. For example, the partitioning engine 220 may be configured to determine, for each received metric, a global maximum and minimum value of the metric over all developers and partition the range of values of the metric between the determined global maximum and global minimum into multiple partitions, e.g., using non-linear bucket division techniques or clustering algorithms. In some cases a determined global maximum value of a metric may be equal to zero, e.g., when the metric describes net new violations.

The partitioning engine 220 can then assign each developer of the code base 240 to one of the multiple partitions for each of the computed metrics. In some implementations the partitioning engine 220 may determine a composite metric for each developer based on the computed metrics. The partitioning engine 220 may partition respective values of the determined composite metric into multiple respective partitions and assign each developer to one of the multiple partitions for the composite metric. The partitioning engine 220 can store the partitions 235 in a collection of developer profiles 250 that stores information about each developer that has contributed to the code base 240. For example, the partition engine 220 can store, for each developer in the developer profiles 250, data representing the computed metrics and composite metric for the developer and the partitions in which the computed metrics and composite metric have been assigned.

The ranking engine 210 receives data representing the partitions 235. The partitions 235 can be received from either the partition engine 220 or from the developer profiles 250.

The ranking engine 210 may generate a partition ranking, e.g., by computing scores for each of the partitions and ranking the partitions based on the computed scores. The ranking engine 210 can then designate developers in top-ranked partitions, e.g., a highest ranked partition or two or more highest ranked partitions, as developers having a particular skill. In some implementations the ranking engine 210 may designate developers in multiple top-ranked partitions as developers having multiple skills. For example, the ranking engine 210 may designate a developer in a top-ranked partition corresponding to a churn metric as a "trail blazer." As another example, the ranking engine 210 may designate a developer in a top-ranked partition corresponding to net new violations of a bug fixing type and in a top-ranked partition corresponding to net new violations of maintenance type as "bug squasher" and "refactorer."

The ranking engine 210 can provide data identifying developers having a particular skill 255 back to the user device 260 in response to the request. For example, the ranking engine 210 can generate a graphical presentation of the data identifying developers having a particular skill 255 and provide the presentation back to the user device 260 in an appropriate format, e.g., as a hypertext markup language (HTML) or Extensible Markup Language (XML) document for display by a web browser. Some implementations include an application for the user device 260 that implements a user interface and can display, in a text or graphical form, data received from the ranking engine 210. For user devices that are smart phones, the application can be what is referred to as an "app."

The ranking engine 210 may further compute a score for each of the multiple partitions for the composite metric and generate a partition ranking. The ranking engine 210 can then designate developers in one or more top-ranked partitions, e.g., a highest scoring partition or two or more highest scoring partitions, as developers having all-round skill. The ranking engine 210 can provide data identifying developers having all-round skill 255 back to the user device 260 in response to the request, e.g., if the user requested data identifying developers with all-round skill, or in addition to data identifying developers with a particular skill 255.

Figure 3:
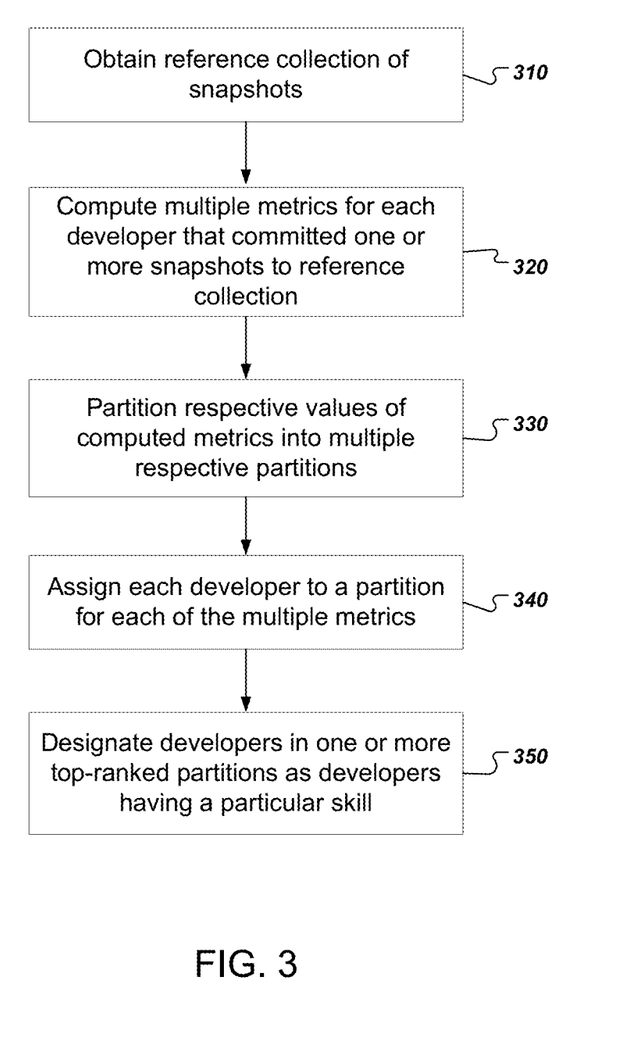
FIG. 3 is a flow chart of an example process for designating developers of a code base as having a particular skill.

FIG. 3 is a flow chart of an example process 300 for designating developers of a code base as having a particular skill. A static analysis system can obtain a reference collection of snapshots for a code base and compute one or more metrics for each developer that committed snapshots to the code base. Developers are designated as having particular skills based on the computed metrics. The example process can be implemented by one or more computer programs installed on one or more computers. The process will be described as being performed by an appropriately programmed system of one or more computers, e.g., the ranking engine 210 of FIG. 2.

The system obtains a reference collection of snapshots for a code base (step 310). Each snapshot in the reference collection of snapshots includes a representation of source code of the code base at a particular time, with each snapshot being associated with a particular developer of multiple developers of the code base. As described above with reference to FIG. 2, a user of the system can submit a request for data identifying developers of a code base with a particular skill and can specify a particular time period over which to identify the developers. For example, in some implementations the reference collection of snapshots for the code base may include snapshots of a reference collection of snapshots spanning an entire project history. In other implementations the reference collection of snapshots for the code base may include snapshots from a preselected period of time, e.g., from a previous year or quarter.

The system computes multiple metrics for each developer that committed at least one snapshot to the reference collection of snapshots (step 320). For example, the system may examine each snapshot in the reference collection of snapshots and compute a measure of each metric of interest for each developer using the following pseudocode For each snapshot in reference_snapshots
metric_counts[snapshot.developer]+=snapshot.metric where reference_snapshots represents the reference collection of snapshots, snapshot.developer represents the developer of the snapshot under examination, and metric_counts represents an associative array that maps developers to metric values. In some implementations the system computes the multiple metrics for each developer that committed at least one snapshot to the reference collection of snapshots in parallel for all snapshots, e.g., using a map-reduce framework.

The multiple metrics computed by the system may include, but are not limited to churn, net violations of a bug fixing type, net violations of a refactoring/maintenance type, or recency, i.e., number and frequency of commits. For example, if a new feature is to be added to source code in the code base the system may compute a measure of churn for each developer in order to identify one or more developers with high churn metrics. As another example, if a release is approaching, the system may compute a measure of net violations of a bug fixing type in order to identify one or more developers that show an expertise for fixing bugs.

Example violations of a refactoring/maintenance type include violations relating to complexity. For example, a method or constructor with high cyclomatic complexity may be difficult to understand and test. Therefore, a developer may incur a cyclomatic complexity violation if the cyclomatic complexity of a portion of code committed by the developer exceeds a predetermined acceptable cyclomatic complexity threshold. As another example, classes that have a high response can be difficult to understand and test, since it may be required to read through all methods that can possibly be called to fully understand the class. Therefore, a developer may incur a class response violation if a number of unique methods or constructors that can be called by all the methods or constructors of the class exceeds a predetermined acceptable class response threshold. As a further example, if the number of calls made by a method or constructor to other methods is high, e.g., due to the method being too large in general, the method having too many responsibilities or the method spending all it's time delegating rather than working itself, the method can be difficult to understand. Therefore, a developer may incur a number of calls in methods violation if a portion of code committed by the developer exceeds a predetermined acceptable number of calls in methods threshold.

Example violations of a bug fixing type include violations relating to logic errors. For example, violations of a bug fixing type may relate to impossible array casts. A developer may incur a bug fixing violation if a portion of code committed by the developer includes a number of impossible array casts that exceeds a predetermined acceptable number of impossible array casts. As another example, violations of a bug fixing type may relate to misleading indentations. If a control structure does not use braces, misleading indentations may make it difficult to see which statements are within its scope. A developer may incur a bug fixing violation if a portion of code committed by the developer includes a number of misleading indentations that exceeds a predetermined acceptable number of misleading indentations. As a further example, violations of a bug fixing type may relate to self-assignments. Assigning a variable to itself has no effect. Therefore, such an assignment is either completely unnecessary, or it indicates a typo or similar mistake. A developer may incur a bug fixing violation if a portion of code committed by the developer includes a number of self-assignments that exceeds a predetermined acceptable number of self-assignments.

Other example metrics that may be computed by the system includes measures of proportions of a project's codebase, measures of rate-of-change of other metrics, measures of an amount of written test code, measures of an amount of written long-term, stable code that is used by many subsystems, measures of contributions of code written in different languages, or aggregations of multiple metrics. Computing multiple metrics for a developer of the code base is described in more detail below with reference to FIG. 4.

The system partitions respective values of the metrics into multiple respective partitions (step 330). In some implementations the system partitions respective values of a metric into multiple partitions by determining a global maximum and minimum value of the metric over all developers that committed at least one snapshot to the reference collection of snapshots and partitioning the range of values between the determined global maximum and global minimum into multiple partitions. For example, the system may determine a global maximum and minimum value of the metric for the reference collection of snapshots using the following pseudocode metric_vals=metric_counts.values.sort( )
global_min=metric_vals.first( )
global_max=metric_vals.last( ).

In some implementations a determined global maximum or minimum value may have a predetermined fixed value. For example, in the case where the system partitions respective values of a net new violation metric, the determined global maximum value may be equal to zero. The system may then divide the range [global_min,global_max] into multiple partitions. For example, the system may apply non-linear bucket division techniques or clustering algorithms, e.g., k-means clustering or hierarchical clustering. In some implementations applying a clustering algorithm may include applying one or more constraints on a number of clusters generated by the clustering algorithm.

The system assigns each developer to one of the multiple partitions for each of the metrics (step 340). For example, as described above with reference to step 330, the system may partition respective values of a computed metric into multiple respective partitions, e.g., six partitions of equal size. In this example, the system may assign each of the developers to one of the multiple partitions using the following pseudocode bucket_size=(global_max−global_min)/6 for each developer
buckets[developer]=floor((metric_counts[developer]−global_min)/bucket_size).

The system designates developers in one or more top-ranked partitions for each of the metrics as developers having a particular skill (step 308). For example, the system may designate developers in a highest ranked partition for a particular metric or developers in the N top-ranked partitions for the particular metric as developers having a particular skill relating to the metric, e.g., developers in a highest ranked partition for a churn metric may be designated as "trail blazers" or developers in a highest ranked partition for a net new violation of bug-types metric may be designated as "bug squashers." Continuing the example above, the system may assign scores to the developers according to the value of buckets [developer] for each metric, where in this example the scores range from zero to five. In this example the system may designate developers with a score of five, or developers with scores of four or higher, in each metric to have a corresponding particular skill.

In some implementations the system may designate developers in one or more top-ranked partitions of a particular metric as having a corresponding skill based on the computed particular metric and other computed metrics, as described above with reference to step 320 or below with reference to FIG. 4. For example, net new violation counts for a developer may be influenced significantly by the number of lines of code added, deleted or changed by the developer, e.g., a developer with high churn is more likely to have removed more violations than a developer who is new to the team. Therefore, the system may designate a developer in a lower ranked partition of net new violations, e.g., a developer who introduced more than one violation, but higher ranked partition of churn as a developer with "bug squashing" skills. Conversely, a developer in a highest ranking partition of net new violations, e.g., a developer who did not introduce any violations, but a low ranking partition of churn, e.g., a developer with significantly low numbers of lines of code added, deleted or changed, may not be designated as a developer with "bug squashing" skills. For example, in these cases the system may determine that the net new violation metric is not a meaningful indicator of the developer's effectiveness in "bug squashing" and that more data is required to establish that the developer consistently introduces a significantly low number of violations.

In some implementations the system may designate developers in one or more top-ranked partitions for a composite metric as developers having all-round skills. For example, at step 320 above the system may compute a composite metric for each developer that committed at least one snapshot to the reference collection of snapshots, e.g., by combining values of individual metrics. The system may then partition the values of the composite metric into multiple partitions and assign each developer to one of the partitions. Developers in one or more top-ranked partitions may then be designated as having all-round skill. In addition, the system may compute composite metrics for groups of developers, e.g., a group of developers that worked on a particular project, a particular team of developers or developers from a particular company.

Figure 4:
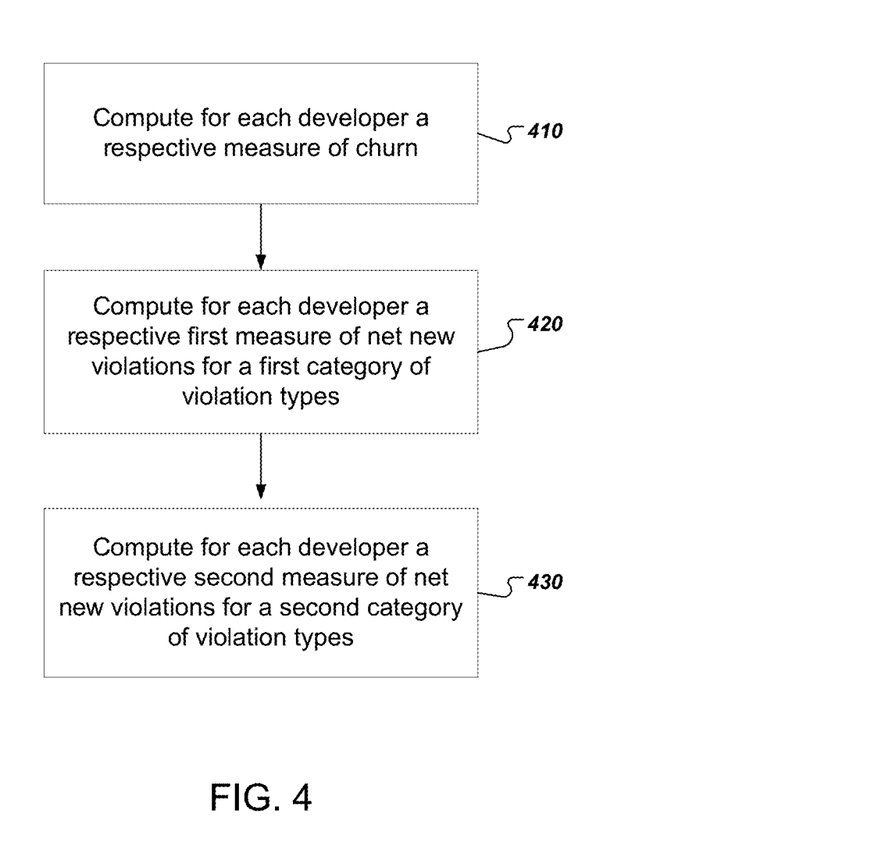
FIG. 4 is a flow chart of an example process for computing multiple metrics for developers of a code base.

FIG. 4 is a flow chart of an example process for computing multiple metrics for developers of a code base. The example process can be implemented by one or more computer programs installed on one or more computers. The process will be described as being performed by an appropriately programmed system of one or more computers, e.g., the snapshot analyzing engine 230 of FIG. 2.

The system computes for each developer a respective measure of churn (step 410). A unit of churn indicates a line of code added, changed, or deleted by the developer in the reference collection of snapshots. A unit of churn may also represent a number of files modified, commits, or any combination of these. For example, a high measure of churn may indicate that a developer has "trail blazing" skills.

The system computes for each developer a respective first measure of net new violations for a first category of violation types (step 420). In order to compute a respective first measure of net new violations for a first category of violation types for a developer the system may compare (i) a first measure of violations introduced by the developer that have a violation type in the first category of violation types to (ii) a second measure of violations removed by the developer that have a violation type in the first category of violation types. For example, the first category of violation types may include bug-type violations.

Bug-type violations in source code include common coding mistakes and a lack of correctness. Bug-type violations can easily lead to defects in software, and addressing bug-type violations immediately reduces a likelihood of defects in the source code. Bug-type violations can include violations relating to arithmetic correctness, concurrency, equality, exceptions, logic errors, resource leaks, result checking and security.

In this case, for each developer, the system may compare a measure of bugs introduced to the source code by the developer to a measure of bugs removed from the source code by the developer to determine a measure of net violations. In some implementations the measure of net violations will include a negative value, e.g., developers may remove more bug violations than they introduce. In these cases a developer with a positive measure of net violations, e.g., a developer who introduced more bug violations than they removed, will be automatically assigned a measure of zero.

The system computes for each developer a respective second measure of net new violations for a second category of violation types (step 430). In order to compute a respective second measure of net new violations for a second category of violation types for a developer the system may compare (i) a first measure of violations introduced by the developer that have a violation type in the second category of violation types to (ii) a second measure of violations removed by the developer that have a violation type in the second category of violation types. For example, the second category of violation types may include maintenance-type violations. Maintenance violations in source code may be viewed as a form of technical debt: they represent a long-term risk to the ability to work with the source code. Maintenance type violations can include violations relating to source code complexity, e.g., cyclomatic complexity, coupling, duplicate code, encapsulation, extensibility, inefficient code, language abuse, size, e.g., number of statements, lines of code, numbers of authors, numbers of fields, number of parameters to methods, statement nesting depth, or useless code, e.g., unused classes, fields or labels. Generally, occurrence of maintenance violations indicate opportunities for structural improvement and highlight areas where it is difficult for developers to augment or maintain the code.

In this case, for each developer, the system may compare a measure of maintenance-type violations introduced to the source code by the developer to a measure of maintenance-type violations removed from the source code by the developer to determine a measure of net violations. In some implementations the measure of net violations will include a negative value, e.g., developers may remove more maintenance violations than they introduce. In these cases a developer with a positive measure of net violations, e.g., a developer who introduced more maintenance violations than they removed, will be automatically assigned a measure of zero.

The multiple metrics computed by the system may include other metrics of interest. For example, in some implementations computing multiple metrics for each developer that committed at least one snapshot to the reference collection of snapshots may further include computing for each developer a respective measure of recency. A unit of recency indicates the commitment of a revised snapshot to the reference collection of snapshots by the developer in the reference collection of snapshots. For example, a high measure of recency may indicate that a developer has "busy beaver" skills.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments and the embodiments described above, the following embodiments are also innovative:

Embodiment 1 is a method comprising:
obtaining a reference collection of snapshots for a code base, wherein each snapshot comprises a representation of source code of the code base at a particular time, each snapshot being associated with a particular developer of a plurality of developers of the code base;
computing a plurality of metrics for each developer that committed at least one snapshot to the reference collection of snapshots, including:
  computing for each developer a respective measure of churn, wherein a unit of churn indicates a line of code added, changed, or deleted by the developer in the reference collection of snapshots;
  computing for each developer a respective first measure of net new violations for a first category of violation types, including comparing (i) a first measure of violations introduced by the developer that have a violation type in the first category of violation types to (ii) a second measure of violations removed by the developer that have a violation type in the first category of violation types;
  computing for each developer a respective second measure of net new violations for a second category of violation types, including comparing (i) a first measure of violations introduced by the developer that have a violation type in the second category of violation types to (ii) a second measure of violations removed by the developer that have a violation type in the second category of violation types;
partitioning respective values of the plurality of metrics into a plurality of respective partitions;
assigning each of the plurality of developers to one of the plurality of partitions for each of the plurality of metrics; and
designating developers in one or more top-ranked partitions as developers having a particular skill.

Embodiment 2 is the method of embodiment 1, wherein computing a plurality of metrics for each developer that committed at least one snapshot to the reference collection of snapshots further includes computing for each developer a respective measure of recency, wherein a unit of recency indicates the commitment of a revised snapshot to the reference collection of snapshots by the developer in the reference collection of snapshots.

Embodiment 3 is the method of any one of embodiments 1-2, wherein the first category of violation types comprises bug-type violations.

Embodiment 4 is the method of any one of embodiments 1-3, wherein the second category of violation types comprises maintenance-type violations.

Embodiment 5 is the method of any one of embodiments 1-4, wherein the reference collection of snapshots for the code base comprises snapshots of a reference collection of snapshots spanning an entire project history.

Embodiment 6 is the method of any one of embodiments 1-5, wherein the reference collection of snapshots for the code base comprises snapshots from a preselected period of time.

Embodiment 7 is the method of any one of embodiments 1-6, wherein partitioning respective values of the plurality of metrics into a plurality of respective partitions comprises, for each metric in the plurality of metrics: determining a global maximum and minimum value of the metric over all developers that committed at least one snapshot to the reference collection of snapshots; partitioning the range of values between the determined global maximum and global minimum into a plurality of partitions.

Embodiment 8 is the method of any one of embodiments 1-7 wherein the determined global maximum value of the net new violations metric is equal to zero.

Embodiment 9 is the method of embodiment 7, wherein partitioning the range of values between the determined global maximum and global minimum into a plurality of partitions comprises applying non-linear bucket division techniques.

Embodiment 10 is the method of embodiment 7, wherein partitioning the range of values between the determined global maximum and global minimum into a plurality of partitions comprises applying a clustering algorithm.

Embodiment 11 is the method of embodiment 10, wherein applying a clustering algorithm comprises applying one or more constraints on a number of clusters generated by the clustering algorithm.

Embodiment 12 is the method of any one of embodiments 1-11, wherein the method further comprises computing a composite metric for each developer based on the computed plurality of metrics; partitioning respective values of the composite metric into a plurality of respective partitions; assigning each of the plurality of developers to one of the plurality of partitions for the composite metric; and designating developers in one or more top-ranked partitions as developers having all-round skill.

Embodiment 13 is the method of any one of embodiments 1-12, wherein computing a plurality of metrics for each developer that committed at least one snapshot to the reference collection of snapshots is performed in parallel for all snapshots.

Embodiment 14 is a system comprising: one or more computers and one or more storage devices storing instructions that are operable, when executed by the one or more computers, to cause the one or more computers to perform the method of any one of embodiments 1-13.

Embodiment 15 is a computer storage medium encoded with a computer program, the program comprising instructions that are operable, when executed by data processing apparatus, to cause the data processing apparatus to perform the method of any one of embodiments 1 to 13.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
receiving a request to compute, for each developer entity of a plurality of developer entities in a reference population of developer entities, respective values for a plurality of different skill metrics for the developer entity, each skill metric corresponding to a respective skill of a plurality of different skills, wherein the value of each skill metric represents a strength of the developer entity at a particular skill relative to the other developer entities in the reference population of developer entities, and wherein each developer entity comprises one or more developers;
obtaining a reference collection of snapshots committed to one or more code bases, wherein each snapshot in the reference collection of snapshots was committed by one respective developer entity of the plurality of developer entities, wherein each snapshot comprises a representation of source code of the code base at a particular time;
computing a plurality of skill metrics for each developer entity of the plurality of developer entities that committed at least one snapshot to the reference collection of snapshots, including:
computing for each developer entity a respective measure of churn, wherein a unit of churn represents a line of code being added, changed, or deleted by the developer entity in a source code file belonging to a snapshot in the reference collection of snapshots;
computing for each developer entity a respective first measure of net new violations for a first category of violation types, including comparing (i) a first measure of violations introduced by the developer entity having a violation type in the first category of violation types to (ii) a second measure of violations removed by the developer entity having a violation type in the first category of violation types; and
computing for each developer entity a respective second measure of net new violations for a second category of violation types, including comparing (i) a first measure of violations introduced by the developer that have a violation type in the second category of violation types to (ii) a second measure of violations removed by the developer that have a violation type in the second category of violation types;
computing, for each respective skill metric of the plurality of skill metrics, a respective global minimum and a respective global maximum for the skill metric, wherein the global minimum represents a smallest computed value among all developer entities in the reference population of developer entities, and wherein the global maximum represents a largest computed value among all developer entities in the reference population of developer entities;
for each skill metric of the plurality of skill metrics:
partitioning, for the skill metric, a range of values between the global minimum for the skill metric and the global maximum for the skill metric into a plurality of partitions;
assigning each developer entity of the plurality of developer entities to one of the plurality of partitions for the skill metric based on a value of the skill metric for the developer entity; and
identifying, for the skill metric, one or more developer entities that have the skill corresponding to the skill metric, the one or more developer entities having the skill being developer entities assigned to a single partition for the skill metric.

2. The method of claim 1, wherein computing a plurality of skill metrics for each developer entity of the plurality of developer entities that committed at least one snapshot to the reference collection of snapshots further comprises computing, for each developer entity, a respective measure of recency, wherein each measure of recency represents a recency-weighted number of commits by the developer entity.

3. The method of claim 1, wherein the first category of violation types comprises bug-type violations, wherein each bug-type violation identifies a coding defect relating to one or more of arithmetic correctness, concurrency, equality, exceptions, logic errors, resource leaks, result checking, or security.

4. The method of claim 1, wherein the second category of violation types comprises maintenance-type violations, wherein each maintenance-type violation identifies a coding defect relating to one or more of source code complexity, coupling, duplicate code, encapsulation, extensibility, inefficient code, language abuse, source code size, numbers of authors, numbers of fields, number of parameters to methods, statement nesting depth, or unused code.

5. The method of claim 1, wherein the reference collection of snapshots comprises snapshots spanning an entire project history.

6. The method of claim 1, wherein the reference collection of snapshots for the code base comprises snapshots from a preselected period of time.

7. The method of claim 1, wherein partitioning the range of values between the global maximum and the global minimum into a plurality of partitions comprises applying non-linear bucket division techniques to divide the range of values.

8. The method of claim 1, wherein partitioning the range of values between the global maximum and the global minimum into a plurality of partitions comprises applying a clustering algorithm and partitioning the range of values according to the clusters resulting from applying the clustering algorithm.

9. The method of claim 1, further comprising:
computing a respective value for a composite metric for each developer entity by combining respective values for each of the plurality of skill metrics;
computing, for the composite metric, a global minimum and a global maximum;
partitioning a range of values between the global minimum for the composite metric and the global maximum for the composite metric into a plurality of partitions;
assigning each developer entity of the plurality of developer entities to one of the plurality of partitions for the composite metric; and
identifying one or more developer entities that have an all-round skill corresponding to the composite metric, the one or more developer entities having the all-round skill being developer entities assigned to a single partition for the composite metric.

10. The method of claim 1, further comprising:
generating a graphical presentation that illustrates relative quantities of developer entities having each of the plurality of skills according to respective values computed for the plurality of skill metrics; and
providing the graphical presentation in response to receiving the request.

11. The method of claim 10, wherein the graphical presentation illustrates the relative quantities of developer entities having each of the plurality of skills in each of a plurality of time periods.

12. A system comprising:
one or more computers and one or more storage devices storing instructions that are operable, when executed by the one or more computers, to cause the one or more computers to perform operations comprising:
receiving a request to compute, for each developer entity of a plurality of developer entities in a reference population of developer entities, respective values for a plurality of different skill metrics for the developer entity, each skill metric corresponding to a respective skill of a plurality of different skills, wherein the value of each skill metric represents a strength of the developer entity at a particular skill relative to the other developer entities in the reference population of developer entities, and wherein each developer entity comprises one or more developers;
obtaining a reference collection of snapshots committed to one or more code bases, wherein each snapshot in the reference collection of snapshots was committed by one respective developer entity of the plurality of developer entities, wherein each snapshot comprises a representation of source code of the code base at a particular time;
computing a plurality of skill metrics for each developer entity of the plurality of developer entities that committed at least one snapshot to the reference collection of snapshots, including:
computing for each developer entity a respective measure of churn, wherein a unit of churn represents a line of code being added, changed, or deleted by the developer entity in a source code file belonging to a snapshot in the reference collection of snapshots;
computing for each developer entity a respective first measure of net new violations for a first category of violation types, including comparing (i) a first measure of violations introduced by the developer entity having a violation type in the first category of violation types to (ii) a second measure of violations removed by the developer entity having a violation type in the first category of violation types; and
computing for each developer entity a respective second measure of net new violations for a second category of violation types, including comparing (i) a first measure of violations introduced by the developer that have a violation type in the second category of violation types to (ii) a second measure of violations removed by the developer that have a violation type in the second category of violation types;
for each skill metric of the plurality of skill metrics:
partitioning, for the skill metric, a range of values between the global minimum for the skill metric and the global maximum for the skill metric into a plurality of partitions;
assigning each developer entity of the plurality of developer entities to one of the plurality of partitions for the skill metric based on a value of the skill metric for the developer entity; and
identifying, for the skill metric, one or more developer entities that have the skill corresponding to the skill metric, the one or more developer entities having the skill being developer entities assigned to a single partition for the skill metric.

13. The system of claim 12, wherein computing a plurality of skill metrics for each developer entity of the plurality of developer entities that committed at least one snapshot to the reference collection of snapshots further comprises computing, for each developer entity, a respective measure of recency, wherein each measure of recency represents a recency-weighted number of commits by the developer entity.

14. The system of claim 12, wherein the first category of violation types comprises bug-type violations, wherein each bug-type violation identifies a coding defect relating to one or more of arithmetic correctness, concurrency, equality, exceptions, logic errors, resource leaks, result checking, or security.

15. The system of claim 12, wherein the second category of violation types comprises maintenance-type violations, wherein each maintenance-type violation identifies a coding defect relating to one or more of source code complexity, coupling, duplicate code, encapsulation, extensibility, inefficient code, language abuse, source code size, numbers of authors, numbers of fields, number of parameters to methods, statement nesting depth, or unused code.

16. The system of claim 12, wherein the reference collection of snapshots comprises snapshots spanning an entire project history.

17. The system of claim 12, wherein the reference collection of snapshots for the code base comprises snapshots from a preselected period of time.

18. The system of claim 12, wherein the operations further comprise:
  generating a graphical presentation that illustrates relative quantities of developer entities having each of the plurality of skills according to respective values computed for the plurality of skill metrics; and
  providing the graphical presentation in response to receiving the request.

19. The system of claim 18, wherein the graphical presentation illustrates the relative quantities of developer entities having each of the plurality of skills in each of a plurality of time periods.

20. A computer program product, encoded on one or more non-transitory computer storage media, comprising instructions that when executed by one or more computers cause the one or more computers to perform operations comprising:
  receiving a request to compute, for each developer entity of a plurality of developer entities in a reference population of developer entities, respective values for a plurality of different skill metrics for the developer entity, each skill metric corresponding to a respective skill of a plurality of different skills, wherein the value of each skill metric represents a strength of the developer entity at a particular skill relative to the other developer entities in the reference population of developer entities, and wherein each developer entity comprises one or more developers;
  obtaining a reference collection of snapshots committed to one or more code bases, wherein each snapshot in the reference collection of snapshots was committed by one respective developer entity of the plurality of developer entities, wherein each snapshot comprises a representation of source code of the code base at a particular time;
  computing a plurality of skill metrics for each developer entity of the plurality of developer entities that committed at least one snapshot to the reference collection of snapshots, including:
    computing for each developer entity a respective measure of churn, wherein a unit of churn represents a line of code being added, changed, or deleted by the developer entity in a source code file belonging to a snapshot in the reference collection of snapshots;
    computing for each developer entity a respective first measure of net new violations for a first category of violation types, including comparing (i) a first measure of violations introduced by the developer entity having a violation type in the first category of violation types to (ii) a second measure of violations removed by the developer entity having a violation type in the first category of violation types; and
    computing for each developer entity a respective second measure of net new violations for a second category of violation types, including comparing (i) a first measure of violations introduced by the developer that have a violation type in the second category of violation types to (ii) a second measure of violations removed by the developer that have a violation type in the second category of violation types;
  for each skill metric of the plurality of skill metrics:
    partitioning, for the skill metric, a range of values between the global minimum for the skill metric and the global maximum for the skill metric into a plurality of partitions;
    assigning each developer entity of the plurality of developer entities to one of the plurality of partitions for the skill metric based on a value of the skill metric for the developer entity; and
    identifying, for the skill metric, one or more developer entities that have the skill corresponding to the skill metric, the one or more developer entities having the skill being developer entities assigned to a single partition for the skill metric.

21. The computer program product of claim 20, wherein the operations further comprise:
  generating a graphical presentation that illustrates relative quantities of developer entities having each of the plurality of skills according to respective values computed for the plurality of skill metrics; and
  providing the graphical presentation in response to receiving the request.

22. The computer program product of claim 21, wherein the graphical presentation illustrates the relative quantities of developer entities having each of the plurality of skills in each of a plurality of time periods.

* * * * *

UNITED STATES PATENT AND TRADEMARK OFFICE
CERTIFICATE OF CORRECTION

| | | |
|---|---|---|
| PATENT NO. | : 9,785,432 B1 | Page 1 of 1 |
| APPLICATION NO. | : 15/290558 | |
| DATED | : October 10, 2017 | |
| INVENTOR(S) | : Ian Paul Wright | |

It is certified that error appears in the above-identified patent and that said Letters Patent is hereby corrected as shown below:

On the Title Page

Under item "(*) Notice", delete this sentence:
"This patent is subject to a terminal disclaimer."

At item (45) Date of Patent, delete the "*"

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*